(12) United States Patent
Berkey

(10) Patent No.: US 6,602,408 B1
(45) Date of Patent: Aug. 5, 2003

(54) FILTRATION SYSTEM FOR WATER GARDEN RESERVOIR

(76) Inventor: Edward B. Berkey, P.O. Box 3483, Bellevue, WA (US) 98009

(*) Notice: Subject to any disclaimer, the term of this patent is extended or adjusted under 35 U.S.C. 154(b) by 110 days.

(21) Appl. No.: 09/796,324

(22) Filed: Feb. 28, 2001

Related U.S. Application Data

(63) Continuation-in-part of application No. 09/183,628, filed on Oct. 30, 1998, now Pat. No. 6,241,877.

(51) Int. Cl.⁷ .................... E02B 11/00; B01D 35/027
(52) U.S. Cl. .................... 210/170; 210/238; 210/241; 210/323.2; 210/463; 210/470; 210/477; 210/482
(58) Field of Search ................. 210/170, 232, 210/238, 241, 256, 323.2, 455, 477, 479, 482, 463, 460, 470, 315, 452, 538, 237; 405/43, 45; 137/236.1

(56) References Cited

U.S. PATENT DOCUMENTS

| | | | |
|---|---|---|---|
| 921,513 A | | 5/1909 | Crawford |
| 1,352,961 A | * | 9/1920 | Hills |
| 2,167,055 A | | 7/1939 | Trowbridge |
| 2,809,752 A | | 10/1957 | Leslie |
| 3,409,223 A | | 11/1968 | Gosh |
| 3,465,529 A | | 9/1969 | Helle |
| 3,923,656 A | * | 12/1975 | Krebs et al. |
| 4,002,566 A | | 1/1977 | Smith |
| 4,081,379 A | | 3/1978 | Smith |
| 4,224,155 A | * | 9/1980 | Milne |
| 4,498,984 A | | 2/1985 | Colson |
| 4,686,718 A | | 8/1987 | Kinkead et al. |
| 4,740,307 A | | 4/1988 | Buelteman |
| 5,120,157 A | | 6/1992 | Todd, Sr. et al. |
| 5,167,368 A | | 12/1992 | Nash |
| 5,178,752 A | | 1/1993 | McKinnon |
| 5,255,999 A | | 10/1993 | Perslow |
| 5,299,384 A | | 4/1994 | Andrews |
| 5,322,035 A | | 6/1994 | Hawes et al. |
| 5,367,723 A | | 11/1994 | Pleva et al. |
| 5,427,679 A | | 6/1995 | Daniels |
| 5,536,397 A | | 7/1996 | D'Offay |
| 5,584,991 A | | 12/1996 | Wittstock et al. |
| 5,624,560 A | | 4/1997 | Voll et al. |
| 5,720,056 A | | 2/1998 | Aymes |
| 5,785,870 A | * | 7/1998 | Davis et al. |
| 5,810,510 A | * | 9/1998 | Urriola |
| 5,993,649 A | | 11/1999 | DeBusk et al. |
| 6,054,045 A | | 4/2000 | Wittstock et al. |

OTHER PUBLICATIONS

Aquascape Designs, Inc. "Professional Pond Kits," wholesale catalog; 1999, 24 pages.

"Builder Tips—Stream Construction," *Aquascape Designs Magazine*, Feb./Mar. 2000, pp. 42–45.

* cited by examiner

Primary Examiner—Joseph Drodge
Assistant Examiner—Terry K. Cecil
(74) Attorney, Agent, or Firm—Christensen O'Connor Johnson Kindness PLLC

(57) ABSTRACT

A filtration system is described for a water garden having a reservoir 10. The reservoir includes a lid 14 and a tubular intake 26 connected to a water line 20 for receiving unfiltered water. The improvement includes a cup-shaped retainer 40 and one or more upright filters 60. The retainer includes a side wall tubular intake 48 mated to the reservoir intake 26 and a lower surface having an opening 50 supporting the filter upper end and may also include a handle 52 supported on the reservoir rim. The filter encompasses the opening so that substantially all unfiltered water entering the retainer intake portion flows downwardly into the upright filter. The retainer is removable from the reservoir and the filter may be removable from the retainer by handle 68.

18 Claims, 6 Drawing Sheets

FILTRATION SYSTEM FOR WATER GARDEN RESERVOIR

CROSS-REFERENCE TO RELATED APPLICATION

This application is a continuation-in-part of U.S. application Ser. No. 09/183,628 filed. Oct. 30, 1998, now U.S. Pat. No. 6,241,877; the priority benefit of which is hereby claimed under 35 U.S.C. § 120.

FIELD OF INVENTION

The present invention relates to filtration systems, and more particularly, to water filtration systems for use in outdoor water gardening ponds, waterfalls, fountains, pools, and the like.

BACKGROUND OF THE INVENTION

As used herein, the term "water garden", "water gardening system", and "water garden system" refer to any one of a number of types of outdoor constructs having at least one open water container, e.g., a pond, a lake, a pool, etc. Many of these constructs further include a fountain, a waterfall, multiple interconnected ponds, subsidiary streams, etc. In all of these systems it is important to circulate and filter the water in order to reduce debris and to add needed oxygen. In some systems it is also necessary to move water from one elevation to another, higher elevation (such as to a waterfall outlet or stream head.)

A superior filtration and circulation system has been designed by the inventor herein for use with water gardens having a container adapted to hold water at a preferred fill height. This system is described in copending application Ser. No. 09/183,628, now U.S. Pat. No. 6,241,877 incorporated herein by reference. The system includes a reservoir, an intake line a pump, and a return line. The reservoir is located near the water container and is capable of holding an amount of reserve water. The intake line includes a first end opening positionable within the water container near the preferred fill height and a second end opening connected to the reservoir. During use, water flows into the reservoir through the intake line, and through a T-shaped connector that is affixed to an upright filter. The pump returns filtered water to a desired location in the water garden (such as a fountain head or waterfall outlet) via the return line. The reservoir is sufficiently large to provide reserve water in an amount capable of compensating for evaporation in the water garden and/or the volume of water that is in motion when the system is activated. The reservoir is also capable of providing a holding area for excess water during times of heavy rain or unanticipated runoff.

The filtration components described in the prior application, though sufficient, are difficult to remove and insert into the reservoir. A user must open the reservoir, reach down through the opening and disconnect the T-shaped connector from the intake line, and then bring the T-shaped connector and its attached filter up through the reservoir opening. This can be a messy task. A second disadvantage of the prior system is the difficulty in trying to change filter mesh sizes. Depending on the time of year, different filters may be needed to screen out a particular type of vegetation. The prior system requires the user to essentially purchase a completely new T-shaped connector and upright filter, which is not desirable from a cost perspective.

Thus, a need exists for a water gardening circulation and filtration system that includes filtration components that are easier to remove and install within the reservoir and that can more easily accommodate varying sizes of debris. The present invention is directed to fulfilling these needs and others as described below.

SUMMARY OF THE INVENTION

In accordance with the teachings of the present invention, an improvement to a filtration system is provided. The system is for use in a water garden that has a reservoir for holding filtration components and for helping to regulate the water level in the water garden.

The reservoir includes an intake opening for accepting unfiltered water and an upper opening with a corresponding lid. The improvement includes a cup-shaped retainer and one or more upright filters. The retainer has an upper opening, surrounding side walls with an intake portion adapted to mate with the reservoir intake opening, and a lower surface with one or more openings. The filter includes an open upper end and is positionable in the opening of the retainer lower surface, with the filter upper end supported therefrom. The filter encompasses the opening so that substantially all unfiltered water entering the retainer intake portion will flow downward into the upright filter. In one embodiment, the reservoir includes an upper interior rim and the retainer is held within the reservoir by portions of the retainer being supported along the rim.

In accordance with other aspects of this invention, the retainer is removable from the reservoir through the reservoir upper opening, and the filter is removable by raising it up through the retainer upper opening and through the reservoir upper opening. In one embodiment, the upright filter includes an elongated handle extending from the filter upper end. The handles aids removal and insertion of the filter from the reservoir.

BRIEF DESCRIPTION OF THE INVENTION

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is an improvement to a water gardening system that skims surface water and debris from the water container and uses gravity to transport the skimmed material to a separate water reservoir. The reservoir houses filtering components and a pump to send the filtered water from the reservoir back to the water container. An advantage of this arrangement is that whenever the water level in a water container is low, water within the reservoir is provided to the container in compensation. If the water level of the container should increase, the excess water is held within the reservoir. In this manner, a near constant level of water is maintained within the water container at all times.

Figure 1:
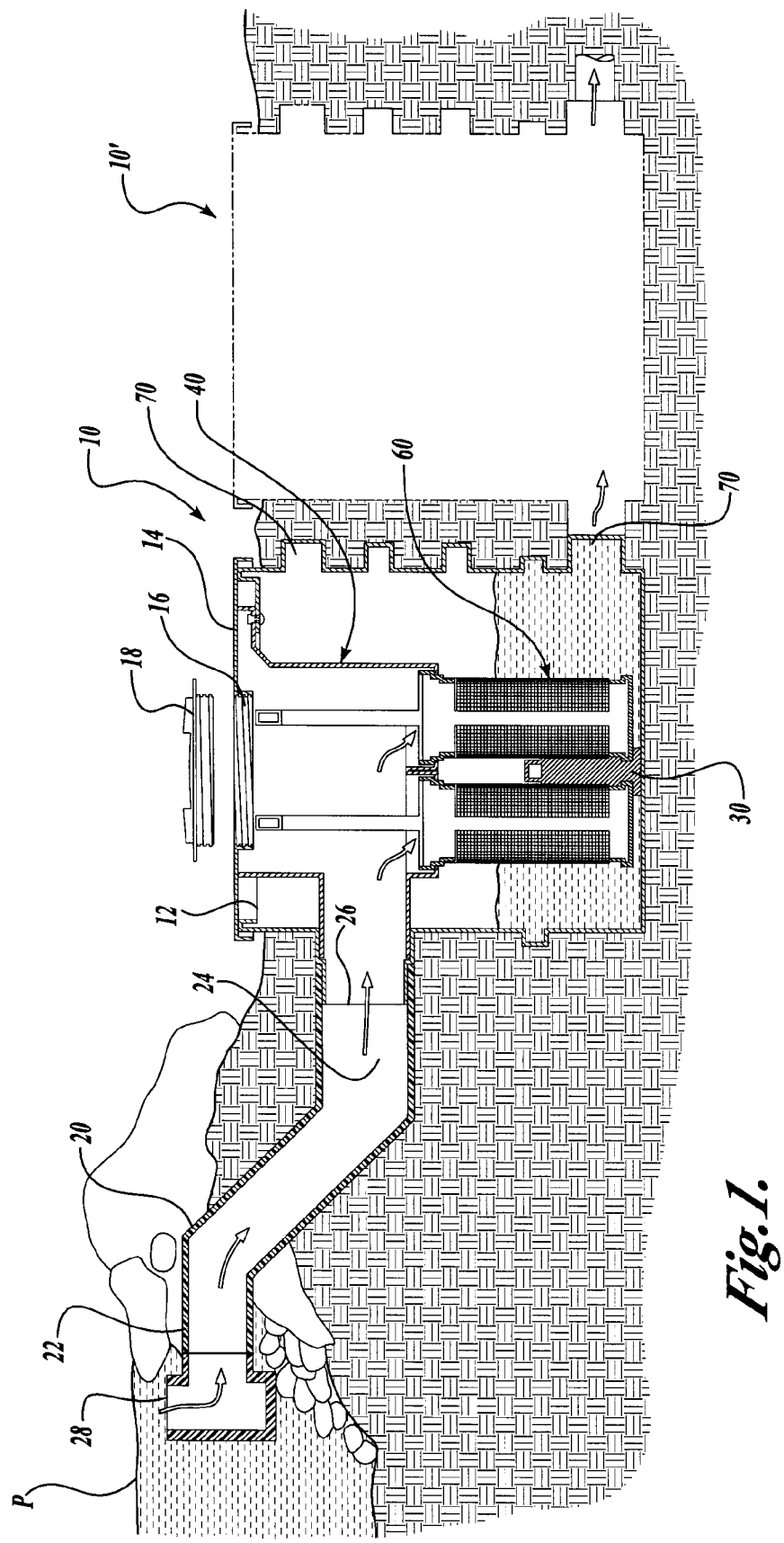
FIG. 1 is a schematic view of a filtration system formed in accordance with the present invention as used in an overall water gardening system, portions of the system being shown in cross-section.
Figure 5:
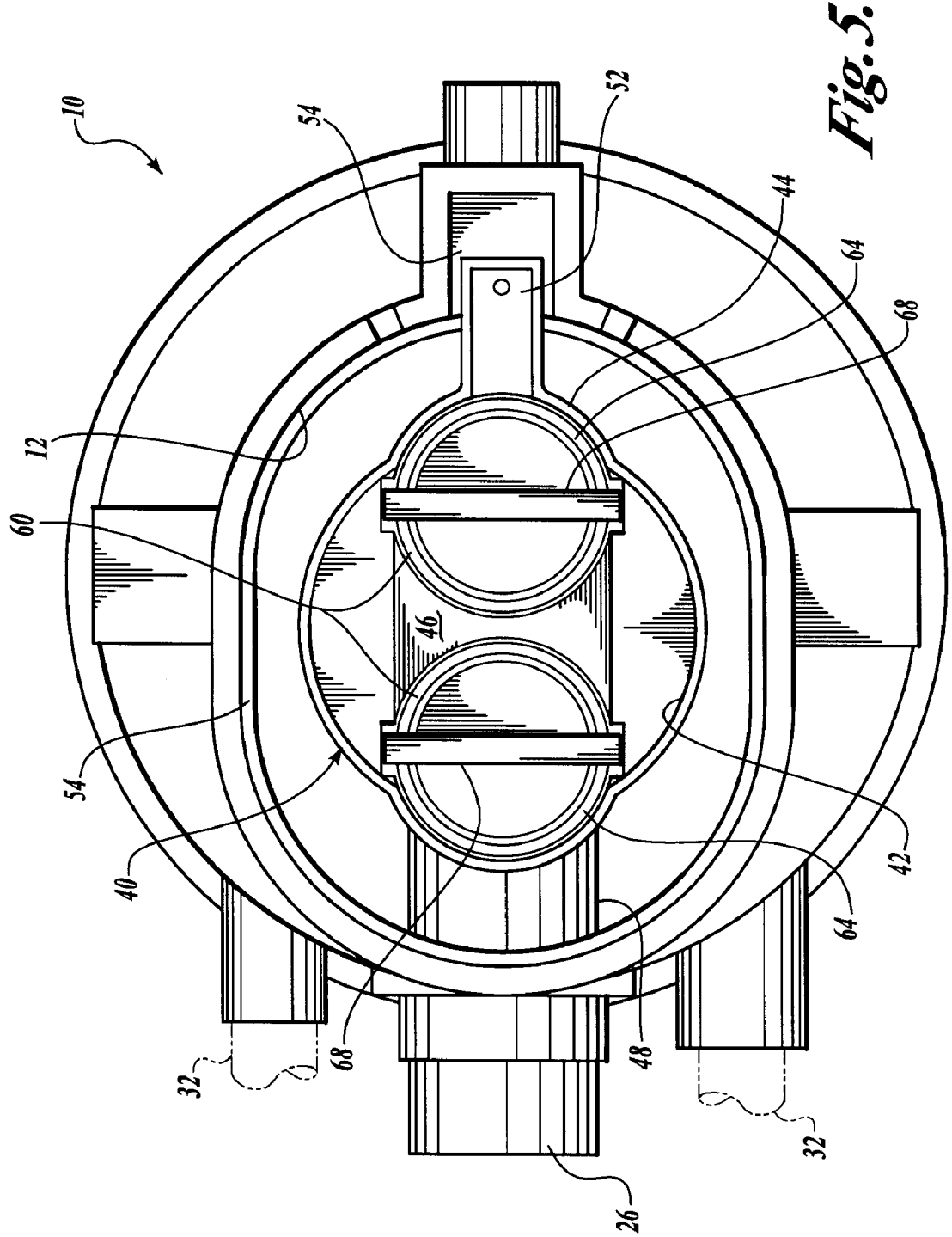
FIG. 5 is a top view of a reservoir, retainer, and two upright filters formed in accordance with the present invention, with the reservoir lid and plug removed.

Referring to FIG. 1, the water container is a man-made pond P formed using conventional methods and materials. A water reservoir 10 is provided separate from the water container, though connected by piping at a predefined distance. The reservoir 10 includes an upper opening 12 positioned roughly at ground elevation. A removable lid 14 is fitted to the upper opening 12. The lid 14 is provided with a smaller access opening 16 and plug 18. A water intake line 20 connects the reservoir 10 with the pond P. The intake line 20 includes first and second ends 22, 24, each having an opening through which water can enter and exit the line, respectively. The reservoir includes an intake opening 26 attachable to the intake line second end 24. A skimmer 28 is attached to the first end 22 of the intake line. During use, pond water enters the skimmer 28 and intake line first end 22, travels through the intake line 20 via gravity, and exits out the intake line second end 24 which is attached to the reservoir 10. Various filtering components are provided within the reservoir for filtering the incoming water. One or more conventional pumps 30 are connected to the reservoir 10 to circulate filtered reservoir water back to the water container via a return line 32. See FIG. 5. In the embodiments of FIGS. 1 and 5, piping (not shown) is provided between the pump and the return line 32.

Figure 2:
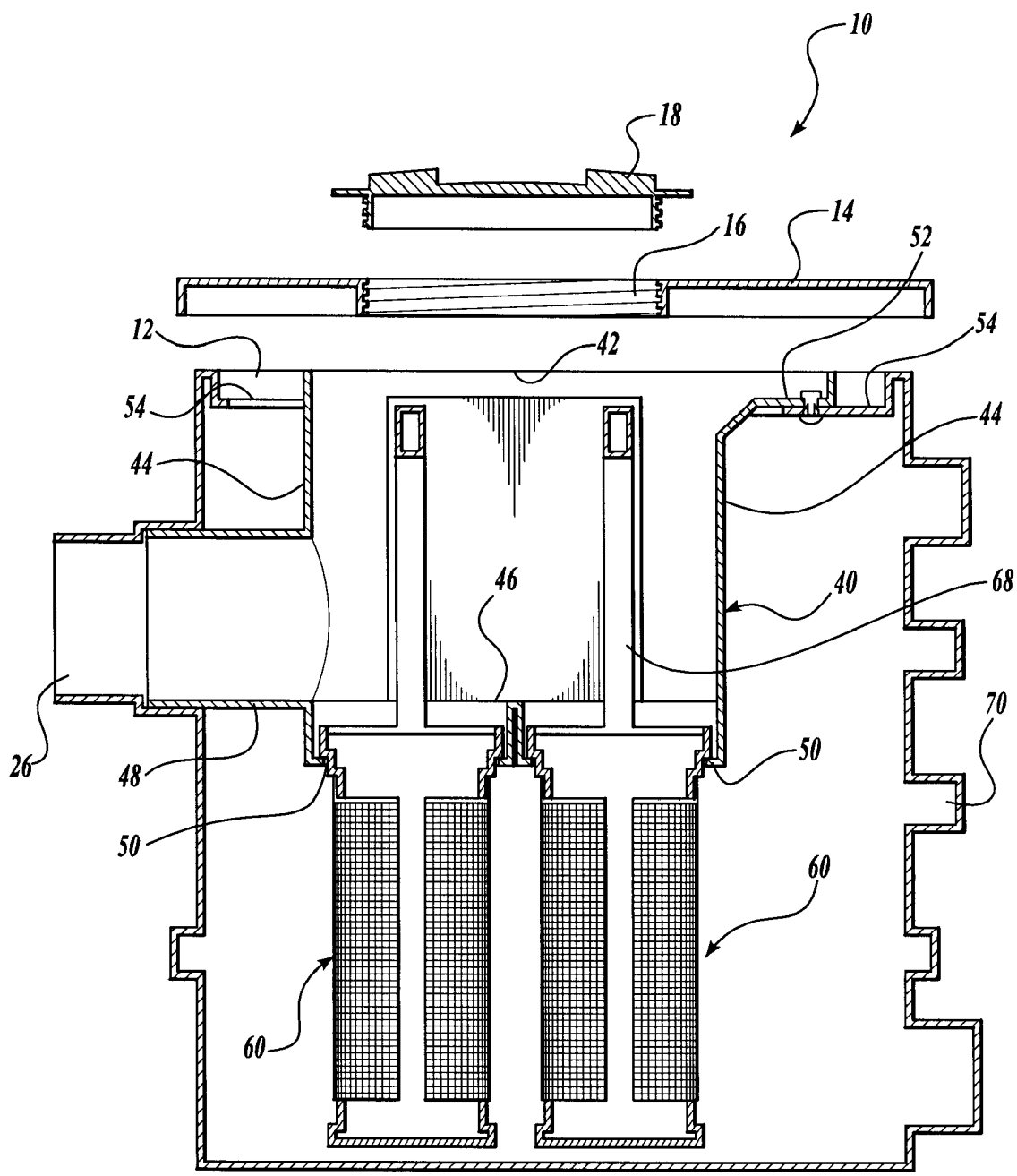
FIG. 2 is an exploded cross-sectional side view of the reservoir and filtration components shown in FIG. 1.

Referring to FIG. 2, the present invention is an improvement to the reservoir 10 and filtering components. The improvement includes a cup-shaped retainer 40 and one or more rigid upright filters 60 positionable within the retainer 40. Both the retainer 40 and the filters 60 are easily removed from the reservoir 10 for cleaning or replacement, as described below.

Figure 3:
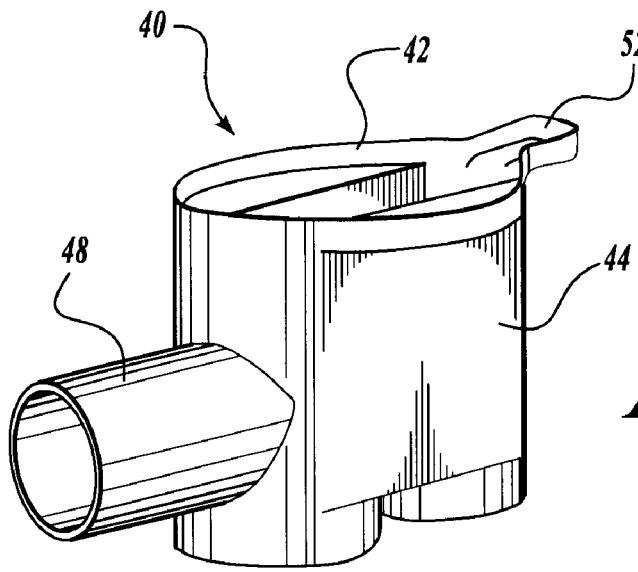
FIG. 3 is a perspective view of a retainer formed in accordance with the present invention.

Referring to FIGS. 2, 3, and 5, the retainer 40 has an upper opening 42, surrounding side walls 44, and a lower surface 46. The surrounding side walls 44 include an intake portion 48 adapted to mate with the reservoir intake opening 26. The intake portion 48 is preferably a horizontal tube that fits tightly into the intake opening 26. The lower surface 46 includes one or more openings 50, preferably at recessed locations. A portion of the retainer may also be supported by the reservoir itself. In the embodiment of FIG. 3, the retainer includes a lateral handle 52 connectable to a rim 54 formed in the interior of the reservoir opening 12. The handle connects to the rim using conventional methods, e.g. by inserting into a groove, by fastening, etc. As installed, unfiltered water flows from the intake line 20, into the reservoir intake opening and through the intake portion 48 of the retainer. Because the filters 60 are located below the intake portion 48, incoming unfiltered water and debris flows downward into the filters 60.

Figure 7:
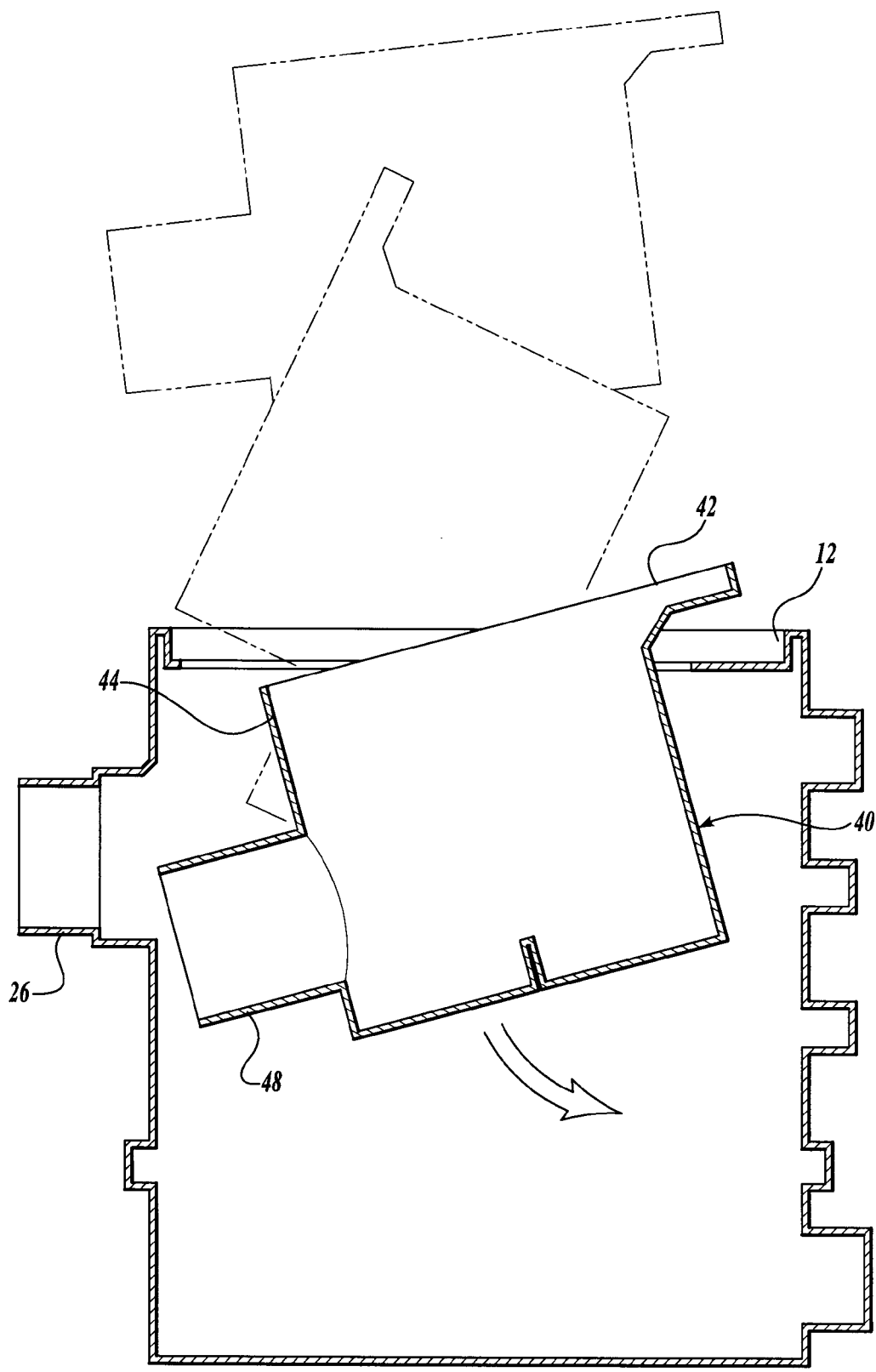
FIG. 7 is cross-sectional side view illustrating the removal and insertion of a retainer.

As shown in FIG. 7, the retainer 40 is removed from the reservoir by sliding the retainer intake portion 48 from the reservoir intake opening 26 and then turning the retainer until it can be lifted through the reservoir upper opening 12. As shown in FIG. 7, this is preferably accomplished after all filters 60 have been removed from the retainer 40. In most operations, removal of the retainer 40 will only be necessary in order to do maintenance on the other reservoir components, such as the pump, refill valve, etc.

Figure 4:
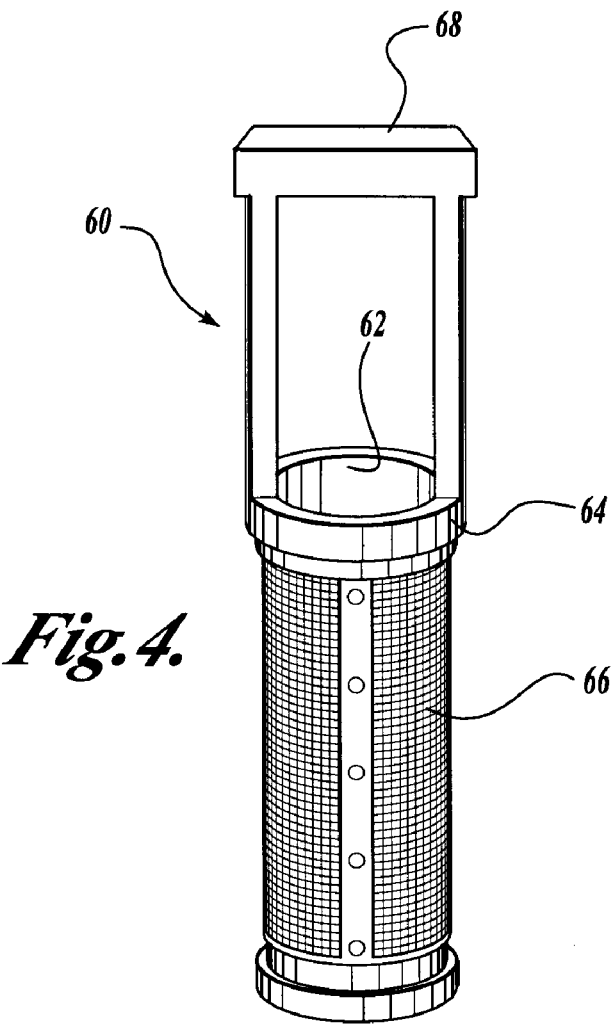
FIG. 4 is a perspective view of an upright filter formed in accordance with the present invention.

Referring to FIG. 4, the upright filter 60 has an open upper end 62 with a collar 64 and a cylindrical mesh 66, or screen, attached to the collar therebelow. An elongated handle 68 stems upward from the collar 64. The lower portion of the mesh is shown closed off by a lower plate. Alternatively, the lower portion may be closed using additional mesh material. The filter 60 is positionable in the opening 50 of the retainer lower surface 46 with the filter collar 64 supported therefrom. The filter 60 is sized to encompass the opening 50 of the retainer lower surface so that substantially all unfiltered water entering the retainer 40 flows downward into the upright filter 60. Other embodiments of filters may be used. Important to the present invention is the use of the retainer to support the filter and the sizing of the filter such that unfiltered water must pass through the filter.

Figure 6:
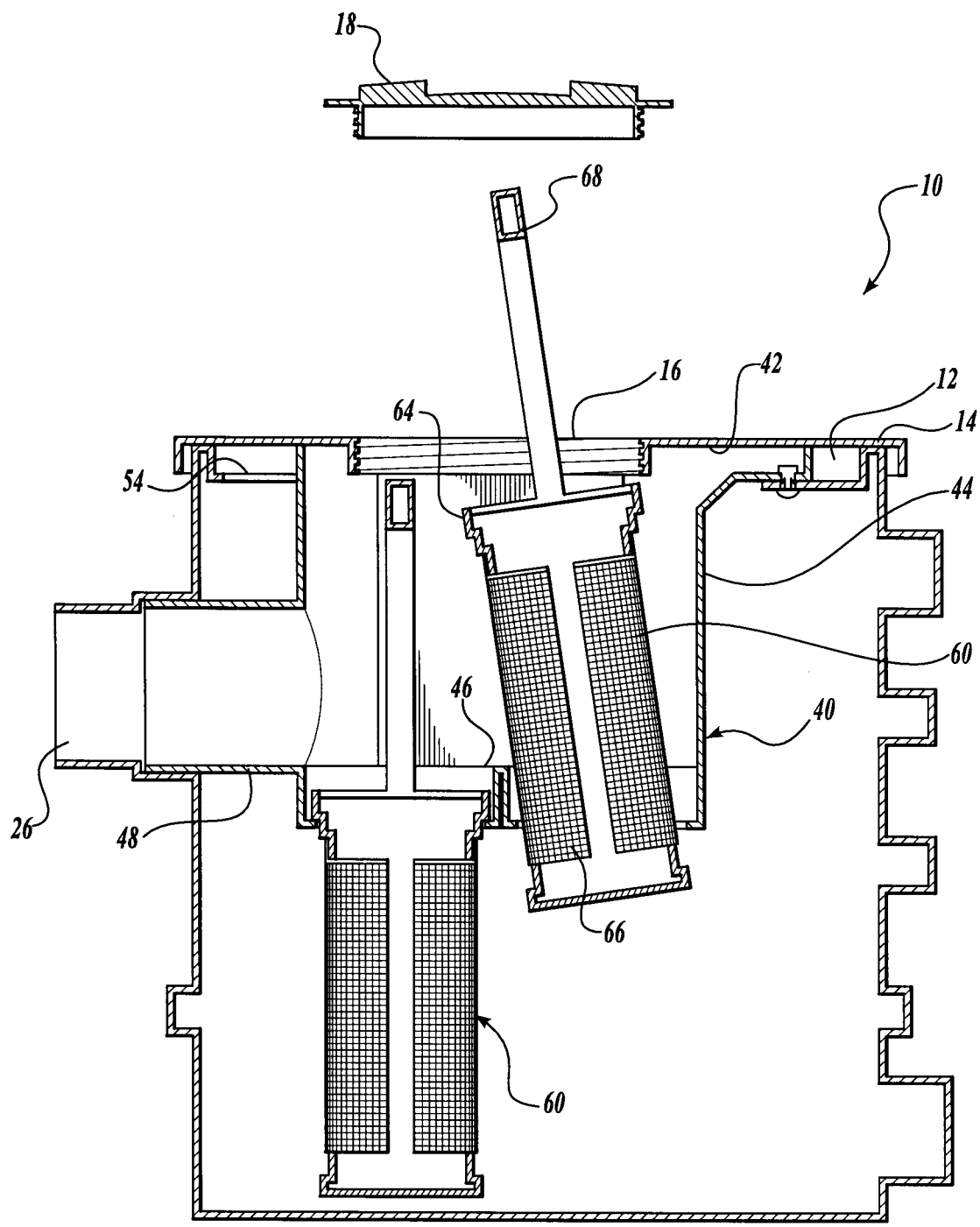
FIG. 6 is a cross-sectional side view illustrating removal and insertion of an upright filter.

As shown in FIG. 6, the filter 60 may be easily removed from the reservoir 10 by removing the access plug 18 and pulling the filter 60 upward by the handle 68, through the access opening 16. The filter 60 is size to pass easily through the access opening 16. A filter is inserted into the reservoir using the reverse operation.

In the embodiments of FIGS. 1–3, the retainer includes two openings and two filters, one filter being seatable within each opening. When plural openings are available, covers may be used for closing off any openings that are not in use, thus forcing unfiltered water to travel through the available filters.

Referring back to FIG. 1, the reservoir 10 may also include various side wall openings 70 of differing sizes. Such openings may be used for connecting to additional water reservoirs 10', accessory kits, etc. An operator may also select a particular opening size for use with the return line. In such cases, the size can be selected based on a desired water flow rate. As shown, the openings are closed off when not in use.

As will be appreciated from the above, the retainer of the present invention allows an operator to easily remove the filters without having to disconnect the retainer intake line from other components. Stated differently, the filter and the retainer are completely separable. This separateness feature gives operators convenient access to the filters without having to remove the entire reservoir lid. The lid can be covered with bark, mulch, or gravel, leaving only the access plug exposed for periodic cleaning of the filters. In addition, the elongated filter handles extend above the normal reservoir water level, to a location near the top of the reservoir. The operator does not have to immerse their entire hand and arm into the unfiltered reservoir water to access the filters. Thus, an operator may switch grades of filters according to the debris characteristic of a particular season, or quickly empty a filter of debris if necessary.

While the preferred embodiment of the invention has been illustrated and described, it will be appreciated that various changes can be made therein without departing from the spirit and scope of the invention. What is important to the present invention is the separateness of the filter and the passing of essentially all unfiltered water through the filters via gravity.

Further, various other known components may be used in conjunction with the above-described elements. For example, each pump may include a low-level shut-off switch to prevent damage to the pumps from lack of reservoir water. The pump may be located exterior to the reservoir, with the appropriate piping connecting therebetween. A water supply line and refill valve may be connected to the reservoir. Various valves may be positioned along the water lines to prevent any unwanted water backflow, or to stop water flow. A water temperature control system may be included. A drain valve is also a useful item to include along one of the return lines so that the pump may be used to reduce the water level within the reservoir during servicing. Other types of filters and filter mediums may be used as well.

The embodiments of the invention in which an exclusive property or privilege is claimed are defined as follows:

1. In a filtration system for use in a water garden having a reservoir, the reservoir including an intake opening for accepting unfiltered water and an upper opening, an improvement comprising:

(a) said intake opening being tubular and extending outwardly from said reservoir and adapted to connect to an unfiltered water intake line;

(b) a cup-shaped retainer having an upper opening, surrounding side walls, and a lower surface; the surrounding side walls including an intake portion adapted to mate with the reservoir intake opening; the intake portion being formed as a tube extending outwardly from the retainer side walls; the lower surface including an opening; the retainer being removable from the reservoir through the reservoir upper opening; and (c) an upright filter having an upper end, the filter being postionable in the opening of the retainer lower surface with the filter upper end supported therefrom, the filter encompassing the opening so that substantially all unfiltered water entering the retainer intake portion flows downward into the upright filter;

wherein the filter is removable from the retainer by raising the filter up through the retainer upper opening and through the reservoir upper opening.

2. The improvement according to claim 1, wherein the reservoir includes a lid having a smaller access opening sized sufficiently large to allow removal and insertion of said upright filter therethrough.

3. The improvement according to claim 2, further comprising a plug for covering the access opening.

4. The improvement according to claim 1, wherein the upright filter includes an elongated handle extending from the filter upper end, the handle aiding removal and insertion of the filter from the reservoir.

5. The improvement according to claim 1, wherein the retainer lower surface includes plural openings and the improvement further includes plural upright filters for seating in the plural openings.

6. The improvement according to claim 5, wherein the plural openings are capable of being closed off when not in use.

7. The improvement according to claim 1, wherein the upright filter is a basket filter having an upper collar supportable at the opening of the retainer lower surface, and a cylindrical wire mesh attached to the collar therebelow.

8. The improvement according to claim 7, wherein the upright filter includes an elongated handle extending from the filter upper collar, the handle aiding removal and insertion of the filter from the reservoir.

9. The improvement according to claim 1, further comprising side wall openings in the reservoir of differing sizes adapted to connect to additional water garden components.

10. The improvement according to claim 1, wherein the reservoir intake opening includes an interior socket, the retainer intake portion inserting into the reservoir socket as assembled.

11. The improvement according to claim 1, wherein the reservoir includes a rim formed in the interior of the reservoir upper opening and the cup-shaped retainer includes a lateral handle attached to the side walls at the retainer upper opening; wherein, during use, the retainer is supported at the reservoir upper opening by connection of the handle to the rim, other portions of the retainer at its upper opening being in a noncontacting relationship with the reservoir.

12. The improvement according to claim 11, wherein the handle is removably held to the rim by a fastener.

13. The improvement according to claim 11, wherein during use, the retainer is supported in the reservoir by connection of the tube with the reservoir and by connection of the retainer handle with the reservoir rim.

14. The improvement according to claim 12, wherein during use, the retainer is supported in the reservoir by connection of the tube with the reservoir and by connection of the retainer handle with the reservoir rim, all remaining portions of the retainer being in a noncontacting relationship with the reservoir.

15. A filtration system adapted to be positioned within a reservoir of a water garden, the filtration system comprising:

(a) a cup-shaped retainer having an upper opening, surrounding side walls, a handle attached to the side walls at the upper opening and extending laterally outward therefrom, and a lower surface; the surrounding side walls including an intake portion adapted to receive unfiltered water, the intake portion including a tube extending outwardly from the retainer side walls; the lower surface including an opening, said handle extending along only a minor portion of the perimeter of said upper opening; and (b) an upright filter having an upper end, the filter being positionable in the opening of the retainer lower surface with the filter upper end supported therefrom, the filter encompassing the opening so that substantially unfiltered water entering the retainer intake portion flows downward into the upright filter; the upright filter and the retainer being completely separable components.

16. The filtration system according to claim 15, wherein the upright filter includes an elongated handle extending from the filter upper end to a location commensurate with the retainer upper opening.

17. The filtration system according to claim 15, wherein the retainer includes plural openings and the filtration system further includes plural upright filters for seating in the plural openings.

18. The filtration system according to claim 15, wherein the upright filter is a basket filter having an upper collar supportable at the opening of the retainer lower surface, and a cylindrical wire mesh attached to the collar therebelow.

* * * * *